Nov. 4, 1924.

H. MEIER

ICE HARVESTING MACHINE

Filed April 11, 1924    2 Sheets-Sheet 1

1,514,298

Inventor
Hans Meier

By Clarence A. O'Brien
Attorney

Nov. 4, 1924.  
H. MEIER  
ICE HARVESTING MACHINE  
Filed April 11, 1924  
1,514,298  
2 Sheets-Sheet 2

Inventor  
Hans Meier  
By Clarence A. O'Brien  
Attorney

Patented Nov. 4, 1924.

1,514,298

UNITED STATES PATENT OFFICE.

HANS MEIER, OF MIDDLEBURG, NEW YORK.

ICE-HARVESTING MACHINE.

Application filed April 11, 1924. Serial No. 705,854.

*To all whom it may concern:*

Be it known that I, HANS MEIER, a citizen of the Republic of Switzerland, residing at Middleburg, in the county of Schoharie and State of New York, have invented certain new and useful Improvements in an Ice-Harvesting Machine, of which the following is a specification.

This invention relates to new and useful improvements in ice harvesting machines and has for its principal object to provide a simple and efficient means whereby cakes of ice may be cut in predetermined sizes, means being provided for holding the ice cutting member and the guide means therefor in an inoperative position while the machine is in the course of transportation and not in use.

A further object of the invention is to provide an ice harvesting machine of the above mentioned character, wherein a circular saw is provided for cutting the ice into cakes, means being further provided for rotating the saw, the saw frame being adapted for swinging movement on its support for holding the saw in an inoperative position.

A still further object of the present invention is to provide an ice harvesting machine of the above mentioned character, wherein the saw blade operating means is simultaneously moved upon the upward swinging movement of the saw supporting frame so as to prevent the accidental displacement of the circular saw operating belt.

A still further object of the invention is to provide an ice harvesting machine of the above mentioned character, which is simple in construction, inexpensive, strong and durable and furthermore adapted for the purposes for which it is designated.

Other objects and advantages of this invention will become apparent during the course of the following description.

In the accompanying drawings forming a part of this specification and in which like numerals designate like parts throughout the same:

Figure 1:
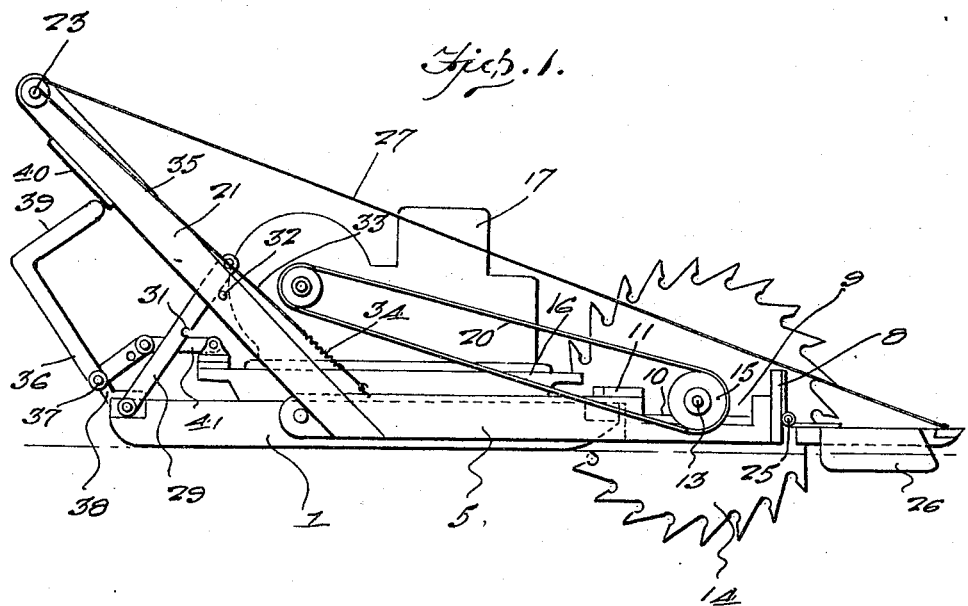
Figure 1 is a side elevation of my ice harvesting machine showing the same in an operative position.

In the drawing wherein for the purpose of illustration is shown the preferred embodiment of my invention, the numerals 1 and 2 designate a pair of sleigh runners which are held in proper spaced relation with respect to each other by means of the cross bars 4. Pivotally supported on the sides of the runners are the side rails or beams 5 and 6 respectively the same being pivotally supported on the runners as is shown at 7. The beams are preferably pivoted on the runners at their rear ends and the forward ends thereof extend outwardly from the forward ends of the runners in the manner clearly illustrated in Figures 1 and 2 of the drawings. The outer ends of the side rails 5 and 6 respectively are secured to a transverse member 8 and this construction provides what I term as the saw frame.

Figure 3:
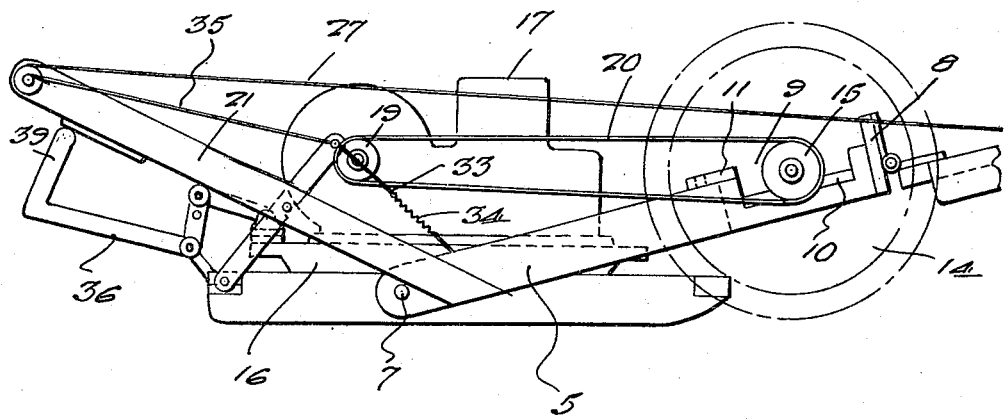
Figure 3 is a side elevation showing the parts in an inoperative position.
Figure 4:
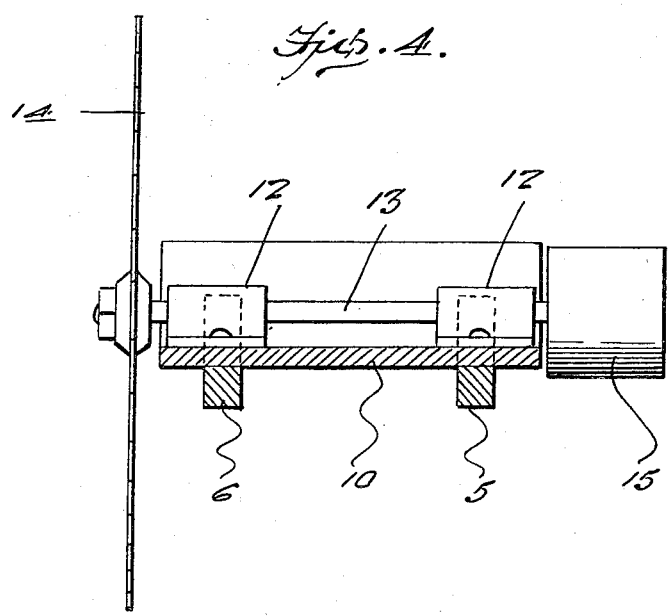
Figure 4 is a transverse section taken approximately on the line 4—4 of Figure 2.

The forward ends of the side rails of the saw frame have their upper edges cut away as shown at 9 and adapted to be supported therein is the transversely extending plate 10, a flange 11 being formed thereon which extends over the upper edges of the side rails in the manner clearly illustrated in Figure 3 of the drawings for the purpose of holding the plate in position on the saw frame. Journaled in suitable bearing brackets 12 and supported on the plate 10 is a transversely extending shaft 13, one end of which supports thereon the circular saw blade 14 while the opposite end supports thereon the pulley wheel 15 whereby means is provided whereby the shaft and the circular saw may be rotated in the manner hereinafter to be more fully described.

Adapted for longitudinal movement on the sleigh runners 1 and 2 is the frame 16 on which is mounted a suitable power plant such as a gasoline engine or the like and is illustrated at 17. The drive shaft of the gasoline engine or power plant 17 is illustrated at 18 and carries on its outer end the pulley wheel 19 which is adapted to cooperate with the pulley wheel 15 in supporting the belt 20. This provides a means whereby the circular saw shaft 13 may be rotated when the power plant 17 is in operation. Although I have shown a pair of pulley wheels and a pulley belt cooperating therewith for the purpose of actuating the shaft 13, it is to be understood that any other suitable means may be employed such as sprocket wheels and a sprocket chain therefor for the purposes of carrying out the objects of the present invention and I do not wish to limit myself to the particular manner in which the saw shaft is to be rotated by the power plant.

Extending upwardly and rearwardly from the rear ends of the side rails 5 and 6 of the saw frame are the levers 21 and 22 respectively. Extending transversely across the upper ends of the levers 21 and 22 respectively and loosely supported therein is the handle 23. The provision of the levers on the rear ends of the saw frame provides a means whereby the saw frame may be swung on the pivot 7 whenever it is desired to raise the saw frame and the saw blade into an inoperative position in the manner clearly shown in Figure 3 of the drawings.

Hingedly supported on the transverse member 8 on the forward end of the saw frame is the guide means which comprises the frame 24, the hinged connection being illustrated by the numeral 25. The guide means is shown at 26 and is carried by the frame 24 in any suitable manner, the guide means being further adapted to operate in a suitable groove or mark in the ice previous to the placing of the circular saw in operation. For the purpose of holding the guide frame 24 in an inoperative position, I provide the cable 27, one end of which is connected to the free outer end of the frame 24 while the opposite end is connected to a suitable pulley wheel 28 mounted on the outer end of the handle 23 in the manner clearly illustrated in Figure 2 of the drawings. By rotating the handle 23, the cable 27 will be wound around the pulley 28 thus causing the upward swinging movement of the guide frame and the guide means carried thereby so as to hold the same in an inoperative position.

Pivotally supported at their lower ends to the rear ends of the sleigh runners 1 and 2 respectively are the upstanding arms 29 and 30 respectively. The intermediate portions of each of the arms are provided on their inner longitudinal edges with suitable notches such as is shown at 31. The purpose of this construction is to provide a means for cooperation with the inwardly extending pins or projections 32 formed on the inner sides of the levers 21 and 22 respectively and normally the upper ends of the arms rest on the pins 32 in the manner shown in Figure 1 of the drawings so that the weight of the saw frame will hold the circular saw in an operative position. To further assure the arms being maintained in their proper position, I provide the upper ends of the arms with suitable eyes to which are connected the upper ends of the cables 33. The lower ends of the cables 33 are fastened to coil springs 34 and the opposite ends of the coil springs 34 are adapted to be connected to the upper edges of the rear ends of the side rails of the saw frame in the manner clearly illustrated in the drawings. The springs 34 normally hold the upper ends of the arms in engagement with the pins 32 extending inwardly from the levers. Cables such as are shown at 35 are fastened at their lower ends to the eyes formed in the upper ends of the arms and the upper ends of the cables 35 are fastened to the outer ends of the handles 23 in the manner clearly illustrated in Figure 2 of the drawings.

This construction provides a means whereby the saw frame may be supported in an upwardly raised position so that the circular saw is in an inoperative position and the pins 32 on the levers 21 and 22 respectively will engage the notches 31 formed on the arms 29 and 30 and will thus hold the saw frame in a raised position. It is of course to be understood that the handle 23 is not turned by the operator so that the springs 34 may cause the engagement of the arms 29 and 30 to insure the seating of the pins in the notches. The springs 34 will further assist in holding the notches in the arms in engagement with the pins when in the position shown in Figure 3 of the drawings. When it is desired to release the notches in the arms from engagement with the pins 32 so that the saw frame and circular saw carried thereby may return to their normal operative positions, the handle 23 is rotated so as to cause the cables 35 to draw upwardly on the upper ends of the arms thus disengaging the notches therein from engagement with the pins. As set forth above, the springs 34 will cause the arms to return into engagement with the pins in the manner illustrated in Figure 1.

To prevent the belt 20 from slipping off of the pulley wheel when the saw frame is in a raised position, I provide a means for holding the belt in a taut position regardless of the position of the saw frame. To this end, I provide a bell crank lever 36 which is pivotally supported at 37 on a suitable bracket 38 carried by the rear cross bar 4 of the sleigh runners and the longer arm of the bell crank lever terminates into the lateral extension 39. The extension 39 is adapted for slidable movement with respect to the plate 40 which extends transversely across the upper ends of the levers 21 and 22 respectively. The shorter arm of the bell crank lever 36 is pivotally connected to a link 41 and the opposite end of the link is fastened to the cross bar 42 which is supported on the frame 16 on which is mounted the power plant 17.

Figure 2:
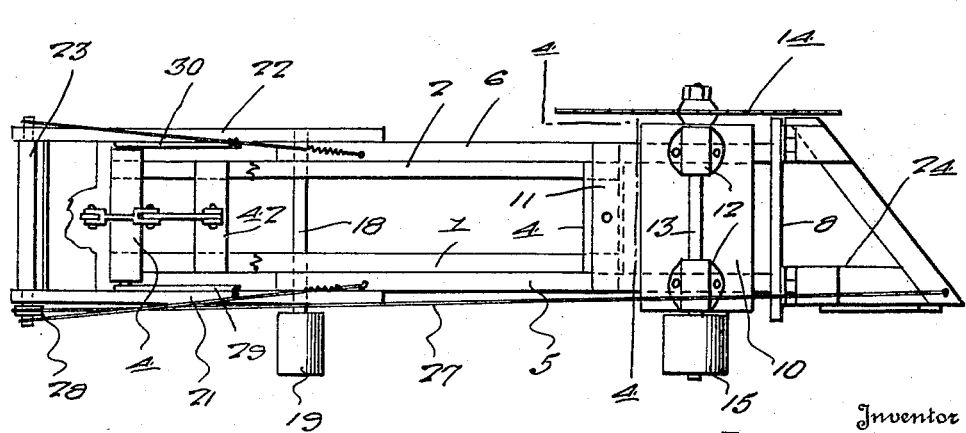
Figure 2 is a top plan view thereof.

The operation of the shifting means for the power supporting frame 16 may be briefly stated as follows: Normally the parts are arranged as shown in Figure 1 of the drawing and the saw is then in operative position. When it is desired to raise the saw out of engagement with the ice, the handle 23 is moved downwardly, causing the downward movement of the levers 21 and 22. The plate 24 will then cause a downward movement on the lateral extensions 39 of the longer arm of the bell crank lever 36 and by moving the bell crank lever 36 downwardly on its pivot 37, the link 41 will be moved rearwardly, causing the frame 16 to move on the sleigh runner to the position shown in Figure 3 of the drawings. The rearward movement of the frame 16 will also cause the rearward movement of the power plant 17 and thus the belt 20 which is trained over the pulley wheels 15 and 19 respectively will be at all times held in a taut position. This will prevent any possibility of the belt from slipping off of the pulley wheel and when the levers are returned to their normal positions, in the manner heretofore set forth, the frame 16 upon which is supported the power plant 17 through the medium of belt 20 will also be caused to return to its normal position simultaneuosly moving the bell crank lever and the parts connected thereto to their normal positions.

It will thus be seen from the foregoing description, that an ice harvesting machine has been provided which is simple in construction, strong and durable and the parts so arranged as to be readily moved to an operative or inoperative position as the case may be. Furthermore, means has been provided for preventing the driving belt for the circular saw shaft from becoming disengaged from its support when the saw frame is moved and supported in an inoperative position. A machine of this character may be easily and readily operated by a single person and will save considerable time and labor in the cutting of cakes of ice in an efficient manner.

While I have shown the preferred embodiment of my invention, it is to be understood that various changes in the size, shape and arrangement of parts may be resorted to without departing from the spirit of the invention and the scope of the appended claims.

Having thus described the invention, what I claim is:—

1. In an ice harvesting machine, in combination, a pair of spaced sleigh runners, a saw frame pivotally supported at its rear end thereon, the forward end of said saw frame extending beyond the forward ends of said runners, a shaft extending transversely across the forward end of said frame, a saw mounted on the outer end of said shaft, a power plant, means associated with said power plant and said shaft for rotating the latter, supporting means for said power plant adapted for longitudinal movement on said runners, levers extending upwardly from the rear ends of said saw frame, a handle supported in the upper ends of said levers, means for holding said saw frame in a raised position, comprising a pair of arms pivotally supported at their lower ends on the rear ends of said sleigh runners, said arms having notches formed therein, pins carried by said levers and adapted to be received in said notches, means for holding the notches in engagement with said pins, and means associated with said power plant supporting frame and operable by the upper ends of said levers for moving rearwardly said power plant and its supporting frame on said runners when the saw frame is raised, the lowering of the saw frame returning the supporting frame and power plant to initial position through the first mentioned means, so that said means has a constant driving relation with said shaft.

2. In an ice harvesting machine, in combination, a pair of spaced sleigh runners, a saw frame pivotally supported at its rear end thereon, the forward end of said saw frame extending beyond the forward ends of said runners, a shaft extending transversely across the forward end of said frame, a saw mounted on the outer end of said shaft, a power plant, means associated with said power plant and said shaft for rotating the latter, supporting means for said power plant adapted for longitudinal movement on said sleigh runners, levers extending upwardly from the rear ends of said saw frame, a handle supported in the upper ends of said levers, means for holding said saw frame in a raised position, comprising a pair of arms pivotally supported at their lower ends on the rear end of said sleigh runners, said arms having notches formed therein, pins carried by said levers and adapted to be received in said notches, means for holding the notches in engagement with said pins, and means associated with said power plant supporting frame and operable by the upper ends of said levers for moving rearwardly said power plant and its supporting frame on said runners when the saw frame is raised, said means comprising a bell crank lever pivotally supported on the rear portion of said runners, a lateral extension formed on the longer arm of said bell crank lever and adapted for engagement with a plate carried by said levers, the shorter arm of said bell crank lever being connected to a link, the latter having connection with the power plant supporting frame, and said first mentioned means serving to move the power plant and supporting frame forwardly when the saw frame is lowered, so that the same driving relation is constantly maintained between the power plant and said shaft.

In testimony whereof I affix my signature.

HANS MEIER.